May 4, 1926.

C. P. STEINMETZ 1,583,622

AUTOMATIC PHASE SHIFTING APPARATUS

Filed August 27, 1923

Inventor:
Charles P. Steinmetz;
by
His Attorney.

Patented May 4, 1926.

1,583,622

UNITED STATES PATENT OFFICE.

CHARLES P. STEINMETZ, OF SCHENECTADY, NEW YORK, ASSIGNOR TO GENERAL ELECTRIC COMPANY, A CORPORATION OF NEW YORK.

AUTOMATIC PHASE-SHIFTING APPARATUS.

Application filed August 27, 1923. Serial No. 659,458.

*To all whom it may concern:*

Be it known that I, CHARLES P. STEINMETZ, a citizen of the United States, residing at Schenectady, in the county of Schenectady, State of New York, have invented certain new and useful Improvements in Automatic Phase-Shifting Apparatus, of which the following is a specification.

My invention relates to automatic phase shifting apparatus, and in particular to the application of such apparatus to a mechanical rectifier in such a manner as to automatically maintain the correct commutating position of the brushes with respect to the commutator with changes in load.

The common form of mechanical rectifier consists of a suitable commutator having its segments connected to an alternating current source of supply and driven with respect to brushes bearing on the commutator in synchronism with the source of supply by a small synchronous motor. Direct current is taken from the commutator by means of the brushes and in order to maintain the best commutating conditions, it becomes necessary to shift the brushes with respect to the commutator as the rectifier load changes. It is of course immaterial whether the synchronous motor drives the commutator with respect to stationary brushes or the brushes with respect to a stationary commutator. If the commutator is driven by the synchronous motor as is usually the case, it has heretofore been necessary to shift the brushes with changes in load to obtain the most desirable commutation.

With my invention, this is no longer necessary since automatic means are provided to change the angular position of the rotating commutator or brushes, as the case may be, with respect to the phase angles of the current supplied to the commutator with changes in load in an amount and direction to maintain the most desirable point of commutation under all conditions. In carrying my invention into effect, I provide means responsive to the current being rectified for shifting the phase angles of the alternating voltage supplied to the synchronous driving motor, whereby the angular position of the rotating parts of the apparatus is always maintained in the correct commutating relation with respect to the stationary parts.

Figure 2:
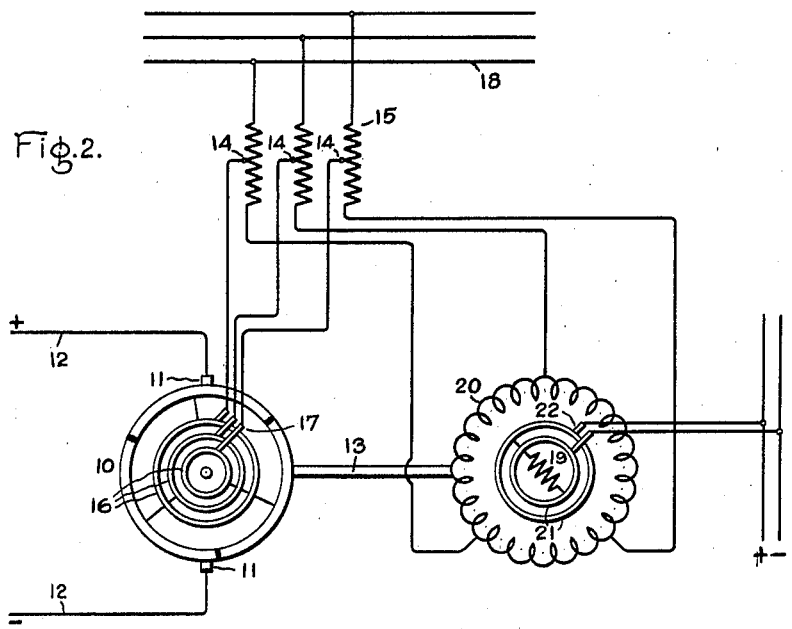
Figure 3:
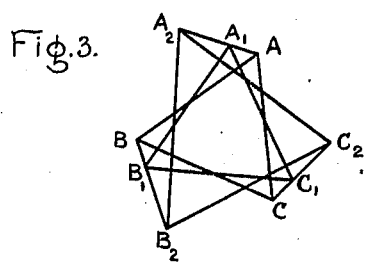

The features of my invention which I believe to be novel and patentable will be pointed out in the claims appended hereto. For a better understanding of my invention reference is made in the following description to the accompanying drawing, Fig. 1 of which represents by means of curves the required shift of the commutation point of a mechanical rectifier with changes in load; Fig. 2 represents a diagrammatic layout of a preferred form of my invention; and Fig. 3 is a vector diagram explanatory of my invention.

Figure 1:
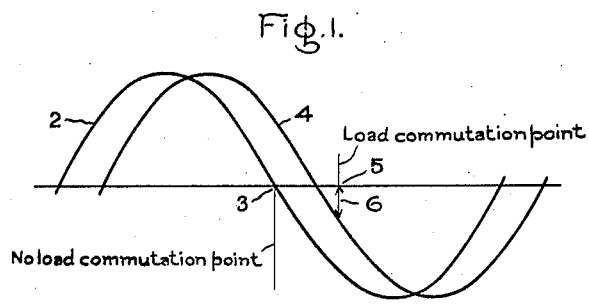

Referring to Fig. 1, curve 2 may be taken to represent the voltage curve of a phase of the current to be rectified when the load is zero. Under this condition the correct position will be at 3 where this curve crosses the zero voltage line. As the load comes on the voltage will lag somewhat as represented by curve 4. Under this condition a voltage of commutation is desirable so that the correct brush position is no longer where the voltage curve crosses the zero line, but at a point 5 which gives a commutation voltage represented by the vertical vector 6. Thus for the change in load supposed, the brushes should be shifted with respect to the commutator from point 3 to point 5. It will be evident that instead of shifting the brushes, the commutator if stationary might be shifted and if the commutator is the rotating element, the angular position of the commutator might be shifted with respect to the phase angle of the alternating current voltage wave impressed upon the commutator. The latter is what happens in the modification of my invention which I have chosen to describe.

Referring to Fig. 2, 10 represents a polyphase commutator connected by stationary brushes 11 to a direct current supply line 12. The commutator is mounted on a rotatable shaft 13 and its segments are respectively connected to the proper phases of a polyphase auto-transformer 15 at intermediate taps 14, by means of slip rings 16 and brushes 17. The auto-transformer is connected to a suitable polyphase alternating current supply line represented at 18. The commutator is driven in synchronism with the alternating current supply by means of a synchronous motor having its rotating field elements 19 connected to shaft 13 and its stationary primary member 20 connected in series with the auto-transformer 15 through the source of supply 18. The field 19 is connected to a suitable direct current source through slip rings 21 and brushes 22.

The primary object of the auto-transformer 15 is to shift the phase angle of the current supplied to the synchronous motor in proportion to the load current passing through the rectifier. With the apparatus described, it will be apparent that very little current will be drawn by the synchronous motor since all the work required of it is to drive the commutator, which load is constant. However, the phase angle of the current supplied to the synchronous motor will change with every change in load on the rectifier.

In Fig. 3, triangle A, B, C may be taken to represent the phase angular position of the voltage supplied to the auto-transformer 15 and the synchronous motor with no load on the rectifier. When the current flows through the rectifier, the phase angular position of the voltage supplied to the slip rings of the rectifier may be represented by triangle $A_1$, $B_1$, $C_1$, which voltage lags behind the line voltage by an amount represented in the angular differences in position of the triangle. This lag produces a proportional but greater lag in the voltage supplied to the synchronous motor, the angular portion of which may be represented by the triangle $A_2$, $B_2$, $C_2$, so that the phase angular position of the rotating field member 19 is shifted with respect to the no-load phase position in the proper direction to compensate for the shift in brushes between no load and load in the ordinary rectifier. By properly selecting the taps 14 on the auto-transformer, to which the rectifier is connected, the amount of this shift may be made correct. The shift thus obtained is of course proportional to the rectifier load and meets the requirements previously mentioned and consequently the most advantageous position of the brushes with respect to the commutator is automatically maintained at all loads although no actual shifting of the brushes is required.

It will of course be evident that the brushes 11 might be rotated by the synchronous motor and the commutator 10 made stationary without departing from my invention. I do not wish to be limited to the use of an auto-transformer as the means for adjusting the phase angle of the current supplied to the synchronous motor since it will be apparent to those skilled in the art that other means may be substituted to accomplish the same result.

What I claim as new and desire to secure by Letters Patent of the United States is:—

1. Electrical apparatus comprising a commutator, direct current brushes bearing thereon, a synchronous motor for causing relative synchronous rotation between said brushes and commutator, an alternating current line, and an auto-transformer connected in series relation between said line and synchronous motor and having intermediate points of the winding of said transformer connected to said commutator.

2. Electrical apparatus comprising a commutator, direct current brushes bearing thereon, a synchronous motor for causing relative synchronous rotation between said brushes and commutator, an alternating current line, and a transformer connected between said line and commutator and having windings connected as an auto-transformer in series relation between said line and synchronous motor, whereby the phase angle of the voltage applied to said synchronous motor is shifted in response to the magnitude of the current flowing through said commutator.

3. Mechanical rectifying apparatus comprising a rotatable commutator, stationary direct current brushes bearing thereon, a polyphase alternating current supply line, a polyphase auto-transformer having a portion of its windings connected in series relation between said commutator and supply line, and a synchronous motor for rotating said commutator in synchronism with the frequency of the supply line, said motor being connected to said supply line through the entire windings of said auto-transformer.

In witness whereof, I have hereunto set my hand this 24th day of August 1923.

CHARLES P. STEINMETZ.